(12) United States Patent
Gallagher et al.

(10) Patent No.: US 12,095,925 B2
(45) Date of Patent: Sep. 17, 2024

(54) MANAGING STANDARD OPERATING PROCEDURES USING DISTRIBUTED LEDGER NETWORKS

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 340 days.

(21) Appl. No.: 17/571,660

(22) Filed: Jan. 10, 2022

(65) Prior Publication Data

US 2023/0224162 A1 Jul. 13, 2023

(51) Int. Cl.
*H04L 9/32* (2006.01)
*H04L 9/00* (2022.01)

(52) U.S. Cl.
CPC .......... *H04L 9/3239* (2013.01); *H04L 9/3247* (2013.01); *H04L 9/50* (2022.05)

(58) Field of Classification Search
CPC ........ H04L 9/3239; H04L 9/3247; H04L 9/50
See application file for complete search history.

(56) References Cited

U.S. PATENT DOCUMENTS

| | | | |
|---|---|---|---|
| 10,402,792 B2 | 9/2019 | Lin et al. | |
| 11,269,859 B1 * | 3/2022 | Luedtke | G06F 16/245 |
| 2011/0302652 A1 * | 12/2011 | Westerfeld | H04L 43/10 |
| | | | 726/22 |
| 2013/0246925 A1 * | 9/2013 | Ahuja | H04L 63/20 |
| | | | 709/224 |
| 2014/0283049 A1 * | 9/2014 | Shnowske | H04L 63/1441 |
| | | | 726/23 |
| 2019/0132350 A1 | 5/2019 | Smith et al. | |
| 2019/0229915 A1 * | 7/2019 | Digiambattista | H04L 63/08 |
| 2020/0294128 A1 * | 9/2020 | Cella | H04L 9/3239 |
| 2020/0327498 A1 | 10/2020 | Weber et al. | |
| 2022/0156249 A1 * | 5/2022 | Luedtke | G06F 16/2379 |

OTHER PUBLICATIONS

NPL Search Terms (Year: 2024).*
Gardner, Blockchain for Supply Chain: Ghost in the Machine or Breakthrough Technology?, Vice President of Supply Chain Management for Lakeshore Learning Materials in Carson, Jan. 2018, 7 pages http://www.naylornetwork.com/cscm-nwl/pdf/Blockchain_for_Supply_Chain.pdf.
Phase 4—Implementation, 9 pages https://blockchain-working-group.github.io/blockchain-playbook/phases/4/.

* cited by examiner

*Primary Examiner* — Syed A Zaidi
(74) *Attorney, Agent, or Firm* — Womble Bond Dickinson (US) LLP

(57) ABSTRACT

Systems and methods of the disclosure include: receiving, by a node of a distributed ledger network, first transaction data, wherein the first transaction data comprises an alert derived from a state of a computer system; storing the first transaction data in a first block of the distributed ledger network; receiving, by the node, second transaction data, wherein the second transaction data comprises an identifier of a remedial action performed on the computer system in response to the alert and a result of performing the remedial action; and storing the second transaction data in a block of the distributed ledger network, wherein the block is provided by one of: the first block or a second block.

17 Claims, 7 Drawing Sheets

MANAGING STANDARD OPERATING PROCEDURES USING DISTRIBUTED LEDGER NETWORKS

TECHNICAL FIELD

The implementations of the disclosure generally relate to computer systems and, more specifically, to managing standard operating procedures using distributed ledger networks.

BACKGROUND

Standard operating procedures (SOPs) are widely used in various computer systems, including in the managed services context. A standard operating procedure is a predefined set of actions that are to be executed to recover a system after a system failure. Stakeholders, including site reliability engineering teams, vendors, and customers, typically have to collaborate and sign off on a specific SOP to be executed for a given system failure. This can often be a random and disorganized process across a number of communication systems, such as emails, tickets, and phone calls. The lack of organization and oftentimes empirical nature of the process can impact the governance, integrity, and transparency of executing SOPs and ultimately lead to distrust between a vendor and customer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
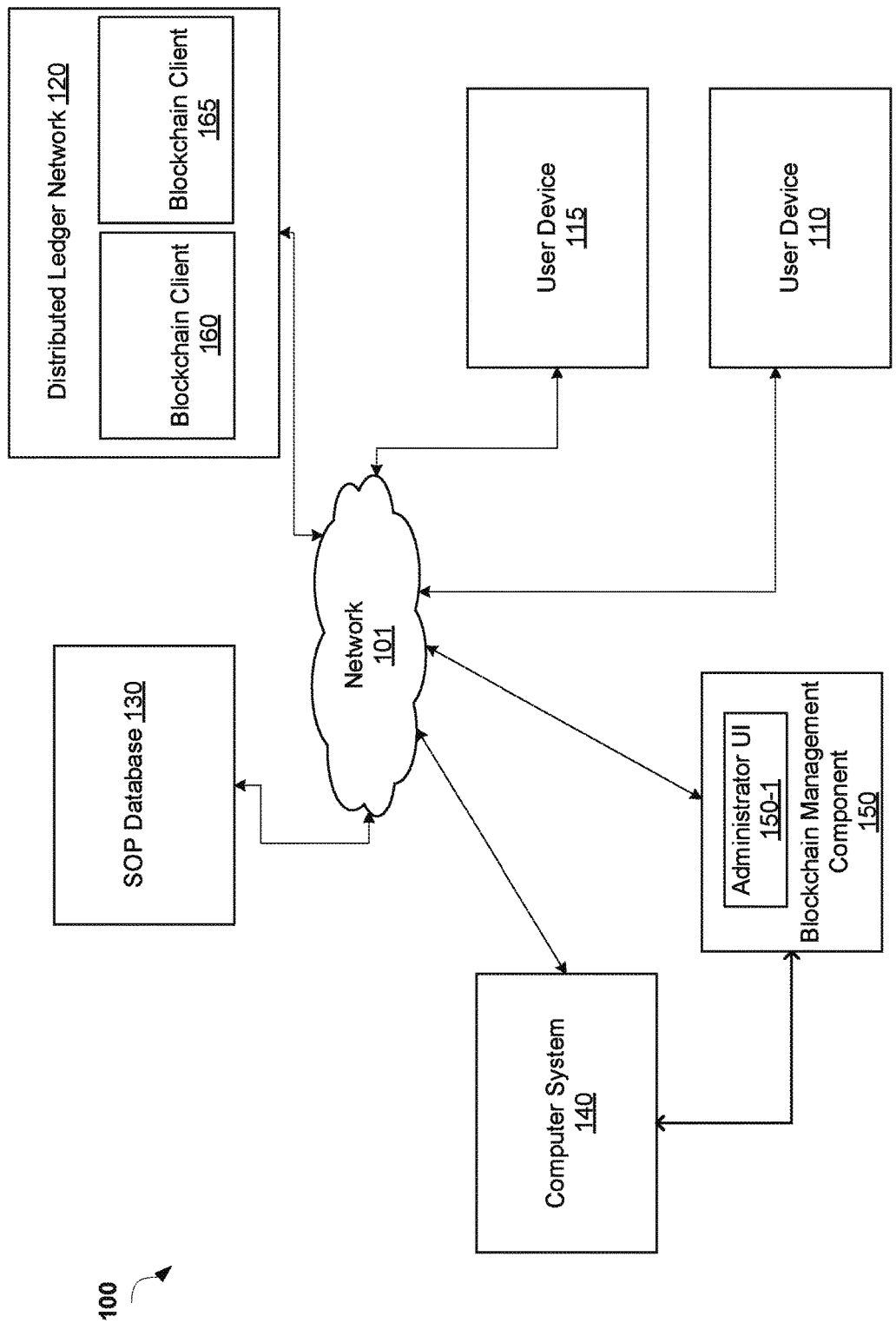
FIG. 1 depicts a block diagram of a network architecture 100 in accordance with one or more aspects of the present disclosure.

Described herein are systems and methods for managing standard operating procedures using distributed ledger networks.

Upon failure of a computer system, such as a production system in a managed service, a standard operating procedure (SOP) is typically used in order to recover the system. An SOP is a predefined set of actions that are to be executed. SOPs are often executed by a site reliability engineering team. In order to decide what SOP needs to be executed in order to recover the system, there is typically a collaboration process between a number of stakeholders, including site reliability engineering teams, vendors, and customers. The process often entails communication among each stakeholder scattered across emails, tickets, and phone calls, and each stakeholder typically has to sign off on the SOP execution. The ad hoc nature of the process can lead to challenges when recovery does not go as expected (i.e., the system failure persists). Furthermore, the ad hoc nature of the process can also lead to challenges during post-recovery analysis of the root cause of the system failure. This can result in a lack of trust between a vendor and its customer, who is relying on the vendor to resolve the system failure.

Aspects of the present disclosure address the above and other deficiencies by providing systems and methods for managing SOPs using distributed ledger networks. A "distributed ledger" is a decentralized database that is spread across multiple (also geographically dispersed) sites. The distributed ledger eliminates the need for a central authentication authority by transferring authority and trust to a virtual network of nodes in a cloud-based system. Each node can sequentially record transactions in a public "block" (e.g., a data structure) of data by creating a unique "chain" also referred to as a blockchain. Each block can contain information associated with a particular electronic (e.g., online) transaction. A transaction generally reflects an update to data maintained on the distributed ledger network.

A "blockchain" is one type of distributed ledger that is used, for example, in a Bitcoin crypto-currency system. The blockchain is a data structure comprising a complete history of each block in the network from the first block to the most recently added block. Blocks of the blockchain behave like containers with data (e.g., transactions) in blocks that are connected to other blocks in the blockchain. The blocks are "immutable" in that they cannot be changed. Each node of the network maintains a copy of the blockchain upon joining the network. Blocks of data are then processed by each node or otherwise added to the blockchain in a linear order. When the nodes are processing the blocks, the nodes link each block of data to a previous block in their copy of the blockchain, using a cryptographic fingerprint, such as a hash function.

To link the blocks, each node generates a cryptographic fingerprint by using a hash function that turns the block's data into a fingerprint of that data (also referred to as a hash value). A hash value is an output string of data generated by using a hash function to an input string of data. Although the input string can be arbitrarily large, the output hash value can be set to a fixed size in accordance with the hash function used. The nodes then successively build blocks that include a reference (e.g., a data pointer) to the hash value of the previous block in the blockchain. As such, the blocks of the blockchain are explicitly ordered by reference for the previous block's hash value, which reflects the content of that previous block. The hash values are used to secure (by cryptography) the authentication of the block data and the source associated with each block in the blockchain, which removes the need for a central authentication authority. Each hash value can be generated based on the input (i.e., the block data). More specifically, a one-way function that produces the same output for a given input can be employed to generate each hash value. A one-way function is a function that, from a computational complexity perspective, is "easy" to obtain an output for a given input, but "hard" to invert the output to identify the given input. This provides security against potential tampering with the blockchain.

Blocks are stored one after the other in the blockchain, but each block can only be added when all of the nodes reach a quorum (consensus) regarding rules about what new blocks can be added. To reach the quorum, the nodes of the network may transmit messages between each other regarding transactions for new block additions that are happening to one another. For example, various consensus schemes can be employed, such as proof-of-work or proof-of-stake methods.

Proof-of-work methods can incentivize participation in consensus by providing a reward for successfully performing consensus tasks. One example of a proof-of-work method is referred to as "mining" (e.g., in Bitcoin). Generally, mining involves attempting to discover a nonce (number used once) value to add to a block corresponding to a transaction to be added to the blockchain. The nonce affects the hash value calculated for a block. Nodes performing the consensus process, referred to as "miners," can agree upon some pattern that should appear in the hash value of the block plus nonce data, and can iterate through a series of random numbers for the nonce until the pattern appears in the hash value (e.g., the pattern can be that the hash value begins with a sequence of six zeroes). Once a nonce value is discovered that can generate the pattern, the nonce value is provided to the other miners to confirm the validity of the nonce value. Once a threshold number of nodes agrees that the nonce value is valid (e.g., a majority of nodes), then consensus is reached and the data can be written to the blockchain. The miner who discovered the nonce value can be provided with a monetary reward (e.g., digital currency).

Proof-of-stake methods can incentivize participation in consensus by employing a stake approach. Here, users can stake credits for the right to validate transactions (e.g., by depositing digital currency into a central wallet), and transaction validation (e.g., mining) power for a user is a function of the amount of credits that have been staked. A user's percentage of the total amount of credits staked can correspond to a percentage of blocks that the user can validate. For example, if a user owns 10% of the total staked credits, the user can validate 10% of the total number of blocks (e.g., a 10% chance to perform the block validation).

In some implementations of the present disclosure, a distributed ledger network can be employed to capture certain details regarding remedial actions executed in response to an alert regarding a state of a computer system (e.g., that the system has failed). A management component of the computer system can detect the alert. Responsive to detecting the alert, the management component of the computer system can build a transaction reflecting the alert and broadcast the transaction over a network connecting the computer system and the distributed ledger network. The transaction data can include relevant data relating to the alert, including data regarding the state of the computer system, e.g., an IP address of the computer system, a computer system ID, a computer system configuration (i.e., a set of software modules with their respective version numbers, etc. For example, the state of the computer system could be a failed state. The transaction data can further include metadata, such as a transaction number associated with the transaction.

In some implementations, multiple blockchain clients (i.e., a node of the distributed ledger network) can listen for transactions broadcasted over the network. If a transaction is broadcasted over the network, one or more blockchain clients can retrieve data associated with the transaction. Responsive to retrieving the transaction data, a blockchain client can validate the transaction data. Validating the transaction data can involve applying a set of validation rules to the transaction. Once the blockchain client validates the transaction data, the blockchain client can add the transaction data to a current block (e.g., the block that is being assembled based on incoming transaction data). Responsive to determining that the block has reached a predefined size, the blockchain client can broadcast the block on the network to other nodes of the distributed ledger network. The blockchain client can further add the block to a local copy of the blockchain stored in a local storage of the blockchain client.

In some implementations, the distributed ledger network can be employed to capture certain details regarding remedial actions executed in response to a request from a user to execute the remedial actions. The management component of the computer system can receive the request to execute the remedial actions. Responsive to receiving the user request, the management component can build a transaction reflecting the user request and broadcast the transaction over a network connecting the computer system and the distributed ledger network. The transaction data can include the user request and relevant data relating to the user request, including the remedial actions requested to be executed, an identification of the user, and a timestamp for when the user request was submitted. The transaction data can further include a transaction number associated with the transaction. In some implementations, the blockchain client (i.e., a node of the distributed ledger network) can listen for transactions broadcasted over the network. If a transaction is broadcasted over the network, the blockchain client can retrieve data associated with the transaction.

Responsive to retrieving the transaction data, multiple blockchain clients (i.e., a node of the distributed ledger network) can validate the transaction data. Validating the transaction data can involve applying a set of validation rules to the transaction. Once the blockchain client validates the transaction data, the blockchain client can add the transaction data to a current block (e.g., the block that is being assembled based on incoming transaction data). Responsive to determining that the block has reached a predefined size, the blockchain client can broadcast the block on the network to other nodes of the distributed ledger network. The blockchain client can further add the block to a local copy of the blockchain stored in a local storage of the blockchain client.

In some implementations, the management component can listen for blocks being broadcasted over the network. In some implementations, the management component can listen for a block storing transaction data relating to the alert and/or user request. Responsive to listening for the block storing transaction data relating to the alert and/or user request, the management component can look up the alert and/or user request in a database connected to the network. In some embodiments, looking up the alert and/or user request in the database includes identifying a corresponding SOP for the alert and/or user request (i.e., one or more remedial actions to be executed) and one or more prerequisites for executing the corresponding SOP. The management component can select the one or more remedial actions and the one or more prerequisites based on the data stored in the database. The one or more prerequisites can be one or more parties that need to sign off on executing the one or more remedial actions. In some implementations, the one or more parties can include one or more relevant stakeholders of the computer system, including site reliability engineering teams, security teams, infrastructure teams, application teams, vendors, customers, etc.

In some implementations, the management component can create a message to send to each party. The message can include the one or more remedial actions. In some implementations, the management component can generate a hash of the message so that it may be sent to each party to be cryptographically signed. The hash for the message can be generated using a secure cryptographic hash function, such as hash-based message authentication code (HMAC) functions, SHA 2, SHA 3, etc. The generated hash can then be sent over a secured communication channel from the monitoring component to one or more user devices of each party for signing. The secured communication channel can be a VPN channel, an SSH channel, a TLS channel, or any similar secured communication channel. Upon receiving the generated hash of the message, each party can select the one or more remedial actions to be executed on the computer system. Each party can then cryptographically sign a response message that contains identifiers of each of the one or more remedial actions using the hash using one of a set of private keys of the computer system. In some implementations, signing the hash of the message can include encrypting the hash with a public key. After signing the hash, each party can send the signed hash to the management component via the secured communication channel. In some embodiments, after signing the hash, each signed hash can be transmitted as a transaction and broadcasted over the network.

In some implementations, the management component can build another transaction reflecting the one or more prerequisites and broadcast the transaction (i.e., data including the one or more required cryptographic signatures from the one or more parties) over the network. In some implementations, the multiple blockchain clients can listen for the transaction broadcasted over the network. A blockchain client can then retrieve the data associated with the transaction. Responsive to retrieving the transaction data, the blockchain client can validate the transaction data. Responsive to validating the transaction data, the blockchain client can add the transaction data to a current block (e.g., the block that is being assembled based on incoming transaction data). Responsive to determining that the block has reached a predefined size, the blockchain client can broadcast the block on the network to other nodes of the distributed ledger network. The blockchain client can further add the block to a local copy of the blockchain stored in a local storage of the blockchain client.

In some implementations, the blockchain management component can confirm that the one or more prerequisites for the corresponding SOP have been satisfied. Confirming that the one or more prerequisites have been satisfied can include listening for a block storing transaction data relating to the one or more prerequisites being broadcasted over the network. The management component can then compare the one or more cryptographic signatures recorded on the block to the identified one or more prerequisites retrieved from the database. Responsive to confirming that the one or more prerequisites have been satisfied, the management component can cause the one or more remedial actions to be executed.

In some implementations, the management component can build another transaction reflecting data relating to the one or more remedial actions executed and a result of executing each remedial action on the computer system. The management component can then broadcast the transaction over the network. Multiple blockchain clients can listen for transactions broadcasted over the network. A blockchain client can then retrieve the data associated with the transaction. Responsive to retrieving the transaction data, the blockchain client can validate the transaction data. Once the blockchain client validates the transaction data, the blockchain client can add the transaction data to a block on the distributed ledger network as described herein above.

In some implementations, the management component can further build another transaction including data relating to the current state of the computer system in response to the execution of the one or more remedial actions. The management component can then broadcast the transaction over the network. Multiple blockchain clients can listen for transactions broadcasted over the network. A blockchain client can then retrieve the data associated with the transaction. Responsive to retrieving the transaction data, the blockchain client can validate the transaction data. Once the blockchain client validates the transaction data, the blockchain client can add the transaction data to a block of the distributed ledger network as described herein above.

Thus, a distributed ledger network can be used to record each aspect of executing a set of remedial actions in a computer system, including the alert received from a management component of the computer system, a set of remedial actions relating to an SOP that are to be executed on the computer system, the prerequisites for executing the set of remedial actions, the result of executing the set of remedial actions, and the state of the system following execution of the set of remedial actions. By maintaining a record of each transaction on a distributed ledger network, implementations of the present disclosure can significantly improve the level of governance of SOP execution by preventing SOPs from being executed without approval from the required stakeholders. Furthermore, implementations of the present disclosure can significantly improve the level of transparency to customers by maintaining a record of each transaction involved in SOP execution, thus improving trust between a vendor and its customer. Further, SOP execution no longer needs to be executed by a site reliability engineering team. Instead, SOP execution can be fully managed using the distributed ledger network. Additionally, implementations of the present disclosure can aid in post-recovery root cause analysis since each aspect of recovery following a system failure is recorded using the distributed ledger network.

Various aspects of the above referenced methods and systems are described in details herein below by way of examples, rather than by way of limitation.

FIG. 1 depicts a block diagram of a network architecture 100 in which implementations of the disclosure may operate. Although implementations of the disclosure are described in accordance with a certain type of system, this should not be considered as limiting the scope or usefulness of the features of the disclosure. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered computing environment ("the cloud").

As shown in FIG. 1, the network architecture 100 includes a distributed ledger network 120 communicably coupled to user devices, such as a user device 110 and a user device 115, an SOP database 130, a computer system 140, and a management component 150 via a network 101. Network 101 may be a private network (e.g., a local area network (LAN), a wide area network (WAN), intranet, or other similar private networks) or a public network (e.g., the Internet). The distributed ledger network 120 may include one or more blockchain clients 160, 165 across one or more machines such as server computers, desktop computers, or any other computing device. Each blockchain client 160, 165 may store data (i.e., transaction data) locally in each blockchain client's local storage. Each blockchain client 160, 165 is a node of the distributed ledger network.

The user devices 110 and 115 may be personal computers (PC), laptops, mobile phones, tablet computers, or any other computing devices. The user devices 110 and 115 may run an operating system (OS) that manages hardware and software of the user devices 110 and 115. An application or a daemon (not shown) may run on the user devices 110 and 115 (e.g., on the OS of each user device).

SOP database 130 may be implemented on one or more machines, such as server computers, desktop computers, or any other computing device. An example of the SOP database 130 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, SOP database 130 might be a network-attached file server, while in other embodiments administration SOP database 130 might be some other type of persistent storage such as an object-oriented database, a relational database, and so forth. The SOP database 130 may be coupled to the management component 150 directly or via a network. In an example, the SOP database 130 can be a relational database management system (RDBMS) used for the storage of information for SOPs. In an example, the SOP database 130 can include processing logic to enable the management component 150 to search for and retrieve data relating to SOPs, including SOP triggers and SOP prerequisites, as described in more detail herein above.

The blockchain clients 160, 165, of examples of the disclosure, can listen for transaction data relating to SOPs, such as SOP alerts and/or user (i.e., customer) requests. Such transaction data can be broadcasted over the network 101 by the management component 150. The management component 150 can receive such data from monitoring the computer system 140 and/or from the user devices 110 and 115 and/or from an administrator via an administrator UI 150-1 of the management component 150. The blockchain clients 160, 165 can retrieve the transaction data broadcasted over the network 101 and validate the transaction data, as described herein below. The blockchain clients can further add the transaction data to a block of the distributed ledger network 120, as described herein above.

Figure 2:
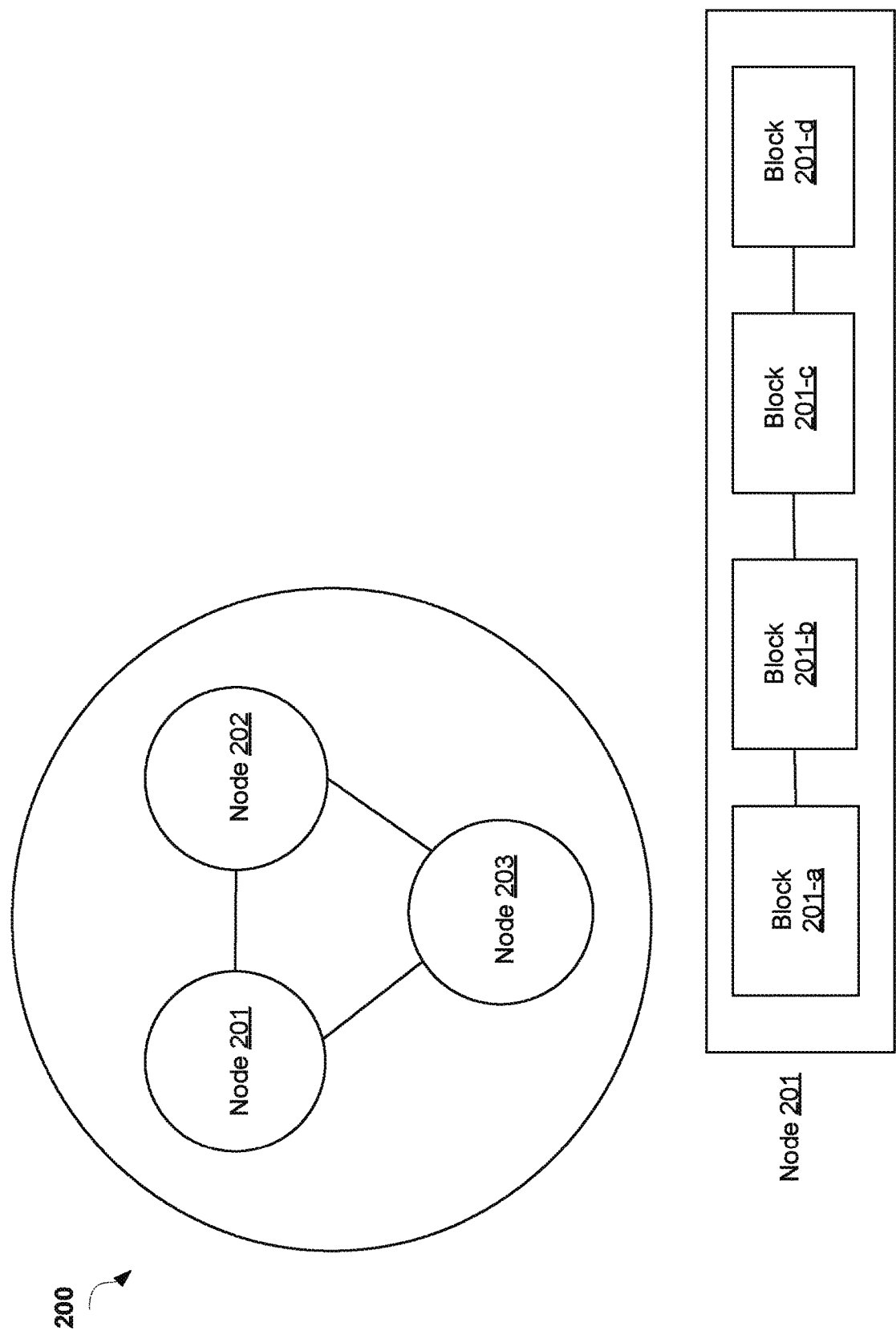
FIG. 2 illustrates an example distributed ledger network in accordance with some implementations of the present disclosure.

FIG. 2 is an example of a distributed ledger network 200 in accordance with one or more aspects of the present disclosure. In some implementations, the distributed ledger network 200 can be a blockchain. A blockchain is a type of distributed ledger that is used, for example, in a Bitcoin crypto-currency system. The blockchain is a data structure comprising a complete history of each block in the distributed ledger network 200 from the first block to the most recently added block. Each node, such as node 201 (e.g., blockchain client 160 of FIG. 1), 202, and 203 as illustrated in FIG. 2, keeps a copy of all or a portion of the blockchain (e.g., the distributed ledger network 200) in storage (e.g., on disk or in RAM) that is local to that node. For example, each node 201, 202, and 203 can receive a copy of the distributed ledger network 200 upon joining the network.

The distributed ledger network 200 can be a public ledger that includes many different individual computer systems that are operated by different entities that maintain a single blockchain. In alternative implementations, the distributed ledger network 200 can include one or more individual computer systems that are all operated by a single entity (e.g., a private or closed system).

The nodes 201, 202, and 203 can sequentially record data (e.g., transactions) into the distributed ledger network 200 as blocks of data. For example, each of the nodes 201, 202, and 203 operated to "process" blocks (e.g., blocks 201-*a*, 201-*b*, 201-*c*, and 201-*d*) of the ledger by validating data (e.g., transactions) associated with each block. Generally, only one of the nodes needs to receive the data that has been broadcasted over a network by a blockchain management component, such as the blockchain management component 150 of FIG. 1. Once one node receives the data, it may propagate that data to other participating nodes within the distributed ledger network 200 so that it can be added to their copy of the distributed ledger.

To validate a new block that is to be consumed (e.g., added) into the distributed ledger network 200, the nodes 201, 202, and 203 perform a hash operation that includes solving a computationally difficult problem that is also easy to verify. For example, each node may attempt to compute a hash value for a block of data using a cryptographic hash function. The input to the hash function may include the data associated with a block, and the output can be a hash value that represents the data (e.g., transactions) of the block. The nodes 202, 202, and 203 can then successively build blocks that include a reference (e.g., a data pointer) to the hash value of the previous block in the distributed ledger network 200. As such, the blocks of the distributed ledger network 200 are explicitly ordered by reference to the previous block's hash value, which reflects the content of that previous block.

Figure 3:
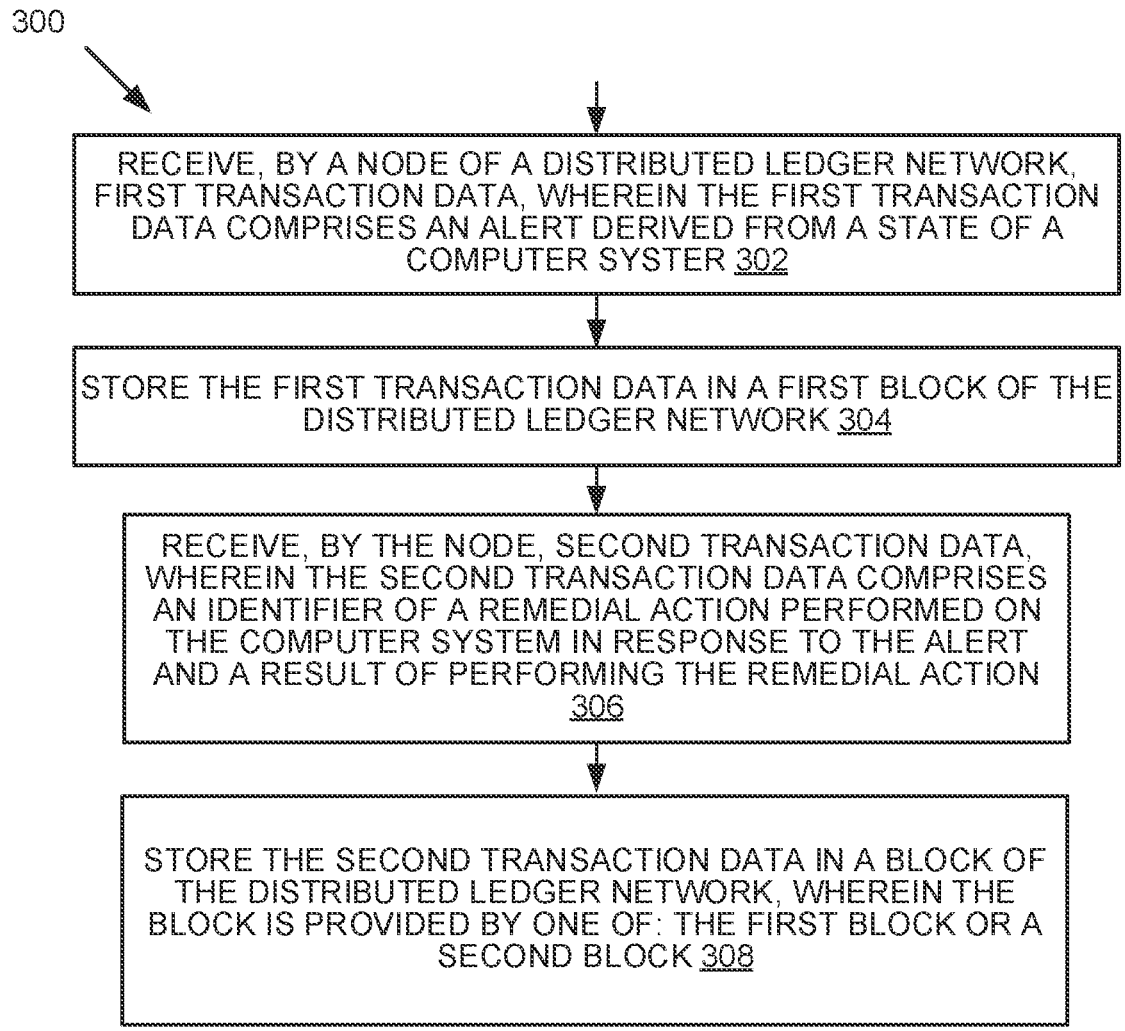
FIG. 3 depicts a flow diagram illustrating an example method of managing standard operating procedures using distributed ledger networks in accordance with some implementations of the present disclosure.

FIG. 3 is a flow diagram illustrating an example method 300 for managing standard operating procedures using distributed ledger networks in accordance with one or more aspects of the present disclosure. Method 300 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, in one embodiment, method 300 begins at block 302, where one or more blockchain clients (e.g., the blockchain client 160 of FIG. 1) of multiple blockchain clients receive transaction data. Each blockchain client is a node of a set of nodes of a distributed ledger network (e.g., the distributed ledger network 200 of FIG. 2). In some embodiments, receiving the transaction data includes the multiple blockchain clients listening for transactions broadcasted over a network (e.g., the network 101 of FIG. 1). If a transaction is broadcasted over the network, the one or more blockchain clients can retrieve data associated with the transaction. In some embodiments, the transaction can be broadcasted by a management component (e.g., the management component 150 of FIG. 1). The management component can broadcast the transaction in response to detecting an alert regarding a state of a computer system, such as the computer system 140 of FIG. 1. The transaction data broadcasted can be, for example, an IP address of the computer system, a computer system ID, a computer system configuration (i.e., a set of software modules with their respective version numbers, etc. In some embodiments, the alert can indicate a failure of the computer system. The computer system can be a production system (e.g., a managed services system). In some embodiments, the management component can broadcast the transaction in response to receiving a request from a user (e.g., a customer). The request from the user can be received via a user device (e.g., the user devices 110 and/or 115 of FIG. 1). The request can be for a custom configuration change of the state of the computer system. The transaction data broadcasted for the user request can include the user request and relevant data relating to the user request, including the one or more remedial actions requested to be executed, an identification of the user, and a timestamp for when the user request was submitted. The transaction data can further include a transaction number associated with the transaction. In some embodiments, broadcasting the transaction can involve the management component building the transaction reflecting the alert and/or user request and then broadcasting the transaction.

At block 304, the blockchain client stores the transaction data on a block of the distributed ledger network. In some embodiments, storing the transaction data on a block includes first validating the transaction data received at block 302. Validating the transaction data can involve a blockchain client of the one or more blockchain clients applying a set of validation rules to the transaction. In some embodiments, the set of validation rules can include verifying that the IP address associated with the transaction data is within a range. In some embodiments, the set of validation rules can include verifying that the computer system ID associated with the transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the transaction data matches a stored version number. For example, the blockchain can compare the version number of the particular software module associated with the transaction data with a version number stored, e.g., locally on the blockchain client. The set of validation rules can be set by a majority of nodes (i.e., blockchain clients) of the distributed ledger network. In response to validating the transaction data, the blockchain client can add the transaction data to a block to the distributed ledger network. In some embodiments, the blockchain client can add the transaction data to a current block, e.g., the block that is being assembled based on incoming transaction data. In some embodiments, the blockchain client can set the block to a predefined size. The predefined size can be defined by the distributed ledger network and/or the computer system and/ or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

At block 306, the one or more blockchain clients receive another transaction data. In some embodiments, receiving the other transaction data can include the multiple blockchain clients listening for transactions broadcasted over the network. If a transaction is broadcasted over the network, the one or more blockchains client can retrieve data associated with the transaction. In some embodiments, the transaction can be broadcasted by the management component. In some embodiments, the management component can retrieve the other transaction data from a database connected to the network (e.g., the SOP database 130 of FIG. 1). The database can include information relating to SOPs, including a list of SOPs, the corresponding triggers for each SOP, and the corresponding prerequisites for each SOP. In some embodiments, the other transaction data can further include data identifying one or more remedial actions performed on the computer system. In some embodiments, the one or more remedial actions can be a set of predefined actions executed on the computer system. The one or more remedial actions can be performed in response to the alert and/or user request received at block 302. In some embodiments, the other transaction data can include data identifying a result of performing the one or more remedial actions (e.g., whether the system recovery was successful). In some embodiments, broadcasting the transaction can involve the management component building the transaction reflecting the one or more remedial actions and the result of performing the one or more remedial actions and then broadcasting the transaction.

At block 308, a blockchain client of the one or more blockchain clients can store the other transaction data on a block of the distributed ledger network, such as the block generated at block 304. Storing the other transaction data on a block of the distributed ledger network can include first validating the other transaction data received. Validating the other transaction data can involve a blockchain client of the one or more blockchain clients applying a set of validation rules to the transaction. In some embodiments, the set of validation rules can include verifying that the IP address associated with the other transaction data is within a range. In some embodiments, the set of validation rules can include verifying that the computer system ID associated with the other transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the other transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the other transaction data matches a stored version number. For example, the blockchain can compare the version number of the particular software module associated with the other transaction data with a version number stored, e.g., locally on the blockchain client. The set of validation rules can be set by a majority of nodes of the distributed ledger network. In response to validating the other transaction data, the blockchain client can add the other transaction data to a block to the distributed ledger network. In some embodiments, the blockchain client can add the other transaction data to a current block, e.g., the block that is being assembled based on incoming transaction data. In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

In some embodiments, the one or more blockchain clients can receive additional transaction data. The additional transaction data can include data regarding the state of the computer system in response to performing the one or more remedial actions. In some embodiments, receiving the additional transaction data can include the multiple blockchain clients listening for transactions broadcasted over the network. If a transaction is broadcasted over the network, the one or more blockchain clients can retrieve the data associated with the transaction. In some embodiments, the transaction can be broadcasted by the management component. The management component can broadcast the transaction in response to determining the state of the computer system after the one or more remedial actions are executed on the computer system. In some embodiments, broadcasting the transaction can involve the management component building the transaction reflecting the state of the computer system and then broadcasting the transaction.

In some embodiments, a blockchain client of the one or more blockchain clients can store the additional transaction data on a block of the distributed ledger network, such as the block generated at block 304. Storing the additional transaction data on a block of the distributed ledger network can include first validating the additional transaction data received. Validating the additional transaction data can involve the blockchain client applying a set of validation rules to the transaction. In some embodiments, the set of validation rules can include verifying that the IP address associated with the additional transaction data is within a range. In some embodiments, the set of validation rules can include verifying that the computer system ID associated with the additional transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the additional transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the additional transaction data matches a stored version number. For example, the blockchain can compare the version number of the particular software module associated with the additional transaction data with a version number stored, e.g., locally on the blockchain client. The set of validation rules can be set by a majority of nodes of the distributed ledger network. In response to validating the additional transaction data, the blockchain client can add the additional transaction data to a block to the distributed ledger network. In some embodiments, the blockchain client can add the additional transaction data to a current block, e.g., the block that is being assembled based on incoming transaction data. In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

In some embodiments, the one or more blockchain clients can receive transaction data including one or more cryptographic signatures. The one or more cryptographic signatures can be from one or more parties (e.g., stakeholders including site reliability engineering teams, security teams, infrastructure teams, application teams, vendors, customers, etc.). In some embodiments, the one or more cryptographic signatures can be generated using a cryptographic hash function. In some embodiments, the management component can create and transmit a message to each user via a corresponding user device (e.g., the user devices 110, 115 of FIG. 1). In some embodiments, the management component can create the message and transmit the message to each user in response to retrieving information from the database connected to the network regarding a corresponding prerequisite for the alert and/or user request received at block 302. The message can include one or more remedial actions. The management component can generate a hash of the message so that it may be sent to each party to be cryptographically signed. The hash for the message can be generated using a secure cryptographic hash function, such as hash-based message authentication code (HMAC) functions, SHA 2, SHA 3, etc. The generated hash can then be sent over a secured communication channel from the blockchain client to the one or more user devices of each party for signing. The secured communication channel can be a VPN channel, an SSH channel, a TLS channel, or any similar secured communication channel. Upon receiving the generated hash of the message, each party can then sign the hash using one of a set of private keys of the computer system. In some implementations, signing the hash of the message can include encrypting the hash with a public key. After signing the hash, each party can send the signed hash to the management component via the secured communication channel. In some embodiments, each party can send the signed hash as a transaction over the network.

In some embodiments, the management component can build a transaction reflecting the one or more cryptographic signatures and broadcast the transaction over the network. Multiple blockchain clients can listen to the network for transactions being broadcasted. The one or more blockchain clients can retrieve the transaction. In response to retrieving the transaction, a blockchain client of the one or more blockchain clients can validate the transaction data. Validating the transaction data can involve the blockchain client applying a set of validation rules to the transaction. In some embodiments, the set of validation rules can include verifying that the IP address associated with the transaction data is within a range. In some embodiments, the set of validation rules can include verifying that the computer system ID associated with the transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the transaction data matches a stored version number. For example, the blockchain can compare the version number of the particular software module associated with the transaction data with a version number stored, e.g., locally on the blockchain client. The set of validation rules can be set by a majority of nodes of the distributed ledger network.

In some embodiments, in response to validating the transaction data, the blockchain client can store the transaction data on a block of the distributed ledger network. Storing the transaction data on a block can include adding the transaction data to a current block (e.g., the block that is being assembled based on incoming transaction data). In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., the other blockchain clients) of the distributed ledger network. In some embodiments, the blockchain client can add the block to a local copy of the blockchain stored in a local storage of the blockchain client.

In some embodiments, the management component can confirm that the corresponding prerequisite has been satisfied. Confirming that the corresponding prerequisite has been satisfied can include listening for a block storing transaction data relating to the one or more cryptographic signatures broadcasted over the network. The management component can then compare the one or more cryptographic signatures recorded on the block to the corresponding prerequisite retrieved from the database. Responsive to confirming that the corresponding prerequisite has been satisfied, the management component can send a notification comprising the one or more remedial actions described at block 306 to the computer system. The computer system can execute the one or more remedial actions.

Figure 4:
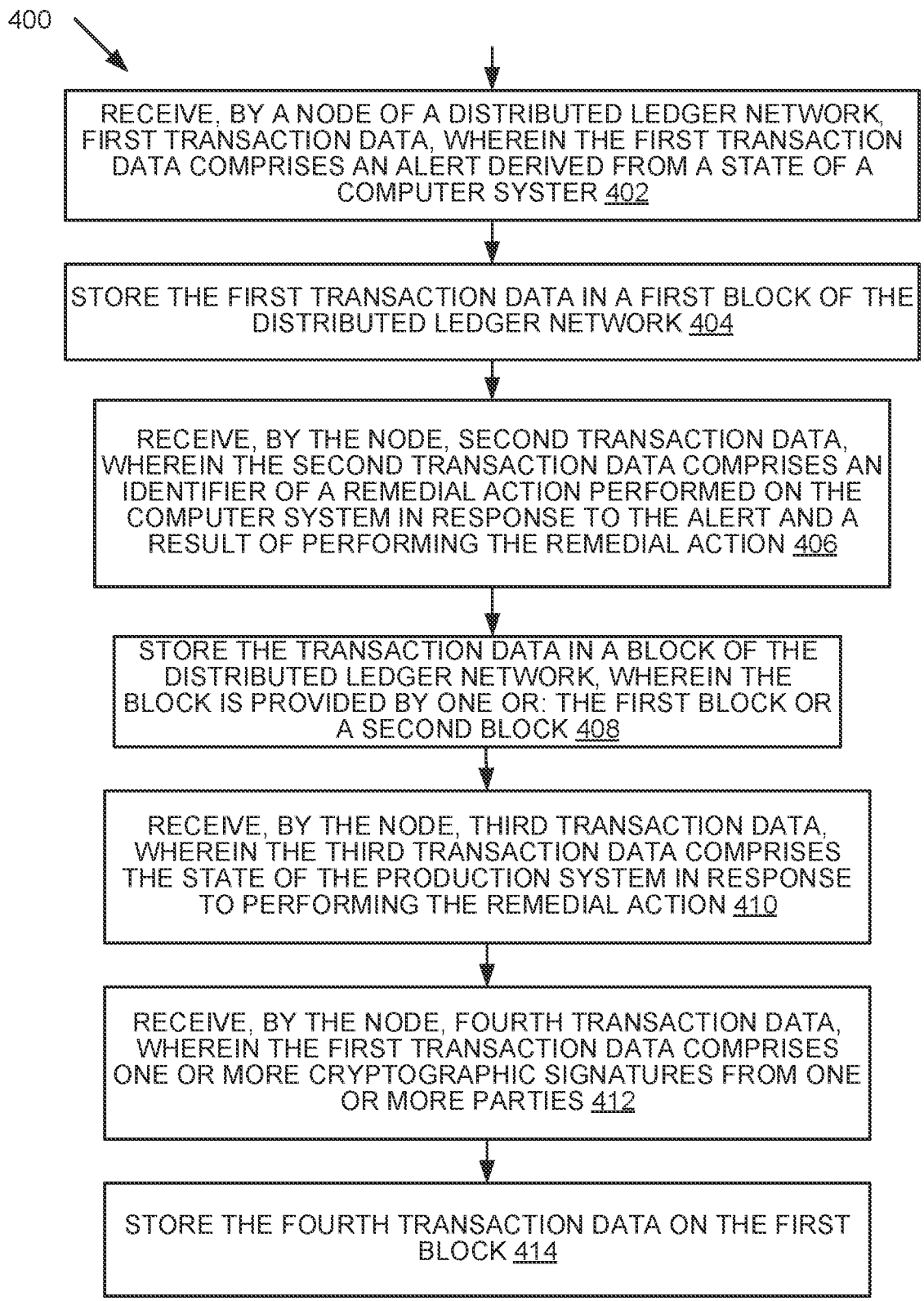
FIG. 4 depicts a flow diagram illustrating an example method of managing standard operating procedures using distributed ledger networks in accordance with some implementations of the present disclosure.

FIG. 4 is a flow diagram illustrating an example method 400 for managing standard operating procedures using distributed ledger networks in accordance with one or more aspects of the present disclosure. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, in one embodiment, method 400 begins at block 402, where one or more blockchain clients (e.g., the blockchain client 160 of FIG. 1) of multiple blockchain clients receive transaction data. Each blockchain client is a node of a set of nodes of a distributed ledger network (e.g., the distributed ledger network 200 of FIG. 2). In some embodiments, receiving the transaction data includes the multiple blockchain clients listening for transactions broadcasted over a network (e.g., the network 101 of FIG. 1). If a transaction is broadcasted over the network, the one or more blockchain clients can retrieve data associated with the transaction. In some embodiments, the transaction can be broadcasted by a management component (e.g., the management component 150 of FIG. 1). The management component can broadcast the transaction in response to detecting an alert regarding a state of a computer system, such as the computer system 140 of FIG. 1. The transaction data broadcasted can be, for example, an IP address of the computer system, a computer system ID, a computer system configuration (i.e., a set of software modules with their respective version numbers, etc. In some embodiments, the alert can indicate a failure of the computer system. The computer system can be a production system (e.g., a managed services system). In some embodiments, the management component can broadcast the transaction in response to receiving a request from a user (e.g., a customer). The request from the user can be received via a user device (e.g., the user devices 110 and/or 115 of FIG. 1). The request can be for a custom configuration change of the state of the computer system. The transaction data broadcasted for the user request can include the user request and relevant data relating to the user request, including the one or more remedial actions requested to be executed, an identification of the user, and a timestamp for when the user request was submitted. The transaction data can further include a transaction number associated with the transaction. In some embodiments, broadcasting the transaction can involve the management component building the transaction reflecting the alert and/or user request and then broadcasting the transaction.

At block 404, the blockchain client stores the transaction data on a block of the distributed ledger network. In some embodiments, storing the transaction data on a block includes first validating the transaction data received at block 402. Validating the transaction data can involve a blockchain client of the one or more blockchain clients applying a set of validation rules to the transaction. In some embodiments, the set of validation rules can include verifying that the IP address associated with the transaction data is within a range. In some embodiments, the set of validation rules can include verifying that the computer system ID associated with the transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the transaction data matches a stored version number. For example, the blockchain can compare the version number of the particular software module associated with the transaction data with a version number stored, e.g., locally on the blockchain client. The set of validation rules can be set by a majority of nodes (i.e., blockchain clients) of the distributed ledger network. In response to validating the transaction data, the blockchain client can add the transaction data to a block to the distributed ledger network. In some embodiments, the blockchain client can add the transaction data to a current block, e.g., the block that is being assembled based on incoming transaction data. In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

At block 406, the one or more blockchain clients receive another transaction data. In some embodiments, receiving the other transaction data can include the multiple blockchain clients listening for transactions broadcasted over the network. If a transaction is broadcasted over the network, the one or more blockchains client can retrieve data associated with the transaction. In some embodiments, the transaction can be broadcasted by the management component. In some embodiments, the management component can retrieve the other transaction data from a database connected to the network (e.g., the SOP database 130 of FIG. 1). The database can include information relating to SOPs, including a list of SOPs, the corresponding triggers for each SOP, and the corresponding prerequisites for each SOP. In some embodiments, the other transaction data can further include data identifying one or more remedial actions performed on the computer system. In some embodiments, the one or more remedial actions can be a set of predefined actions executed on the computer system. The one or more remedial actions can be performed in response to the alert and/or user request received at block 402. In some embodiments, the other transaction data can include data identifying a result of performing the one or more remedial actions (e.g., whether the system recovery was successful). In some embodiments, broadcasting the transaction can involve the management component building the transaction reflecting the one or more remedial actions and the result of performing the one or more remedial actions and then broadcasting the transaction.

At block 408, a blockchain client of the one or more blockchain clients can store the other transaction data on a block of the distributed ledger network, such as the block generated at block 404. Storing the other transaction data on a block of the distributed ledger network can include first validating the other transaction data received. Validating the other transaction data can involve a blockchain client of the one or more blockchain clients applying a set of validation rules to the transaction. In some embodiments, the set of validation rules can include verifying that the IP address associated with the other transaction data is within a range. In some embodiments, the set of validation rules can include verifying that the computer system ID associated with the other transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the other transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the other transaction data matches a stored version number. For example, the blockchain can compare the version number of the particular software module associated with the other transaction data with a version number stored, e.g., locally on the blockchain client. The set of validation rules can be set by a majority of nodes of the distributed ledger network. In response to validating the other transaction data, the blockchain client can add the other transaction data to a block to the distributed ledger network. In some embodiments, the blockchain client can add the other transaction data to a current block, e.g., the block that is being assembled based on incoming transaction data. In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

At block 410, the one or more blockchain clients can receive additional transaction data. The additional transaction data can include data regarding the state of the computer system in response to performing the one or more remedial actions. In some embodiments, receiving the additional transaction data can include the multiple blockchain clients listening for transactions broadcasted over the network. If a transaction is broadcasted over the network, the one or more blockchain clients can retrieve the data associated with the transaction. In some embodiments, the transaction can be broadcasted by the management component. The management component can broadcast the transaction in response to determining the state of the computer system after the one or more remedial actions are executed on the computer system. In some embodiments, broadcasting the transaction can involve the management component building the transaction reflecting the state of the computer system and then broadcasting the transaction.

In some embodiments, a blockchain client of the one or more blockchain clients can store the additional transaction data on a block of the distributed ledger network, such as the block generated at block 404. Storing the additional transaction data on a block of the distributed ledger network can include first validating the additional transaction data received. Validating the additional transaction data can involve the blockchain client applying a set of validation rules to the transaction. In some embodiments, the set of validation rules can include verifying that the IP address associated with the additional transaction data is within a range. In some embodiments, the set of validation rules can include verifying that the computer system ID associated with the additional transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the additional transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the additional transaction data matches a stored version number. For example, the blockchain can compare the version number of the particular software module associated with the additional transaction data with a version number stored, e.g., locally on the blockchain client. The set of validation rules can be set by a majority of nodes of the distributed ledger network. In response to validating the additional transaction data, the blockchain client can add the additional transaction data to a block to the distributed ledger network. In some embodiments, the blockchain client can add the additional transaction data to a current block, e.g., the block that is being assembled based on incoming transaction data. In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., other blockchain clients) of the distributed ledger network. In some embodiments, the blockchain client can add the block to a local copy of the blockchain stored in a local storage of the blockchain client.

At block 412, the one or more blockchain clients can receive transaction data including one or more cryptographic signatures. The one or more cryptographic signatures can be from one or more parties (e.g., stakeholders including site reliability engineering teams, security teams, infrastructure teams, application teams, vendors, customers, etc.). In some embodiments, the one or more cryptographic signatures can be generated using a cryptographic hash function. In some embodiments, the management component can create and transmit a message to each user via a corresponding user device (e.g., the user devices 110, 115 of FIG. 1). In some embodiments, the management component can create the message and transmit the message to each user in response to retrieving information from the database connected to the network regarding a corresponding prerequisite for the alert and/or user request received at block 302. The message can include one or more remedial actions. The management component can generate a hash of the message so that it may be sent to each party to be cryptographically signed. The hash for the message can be generated using a secure cryptographic hash function, such as hash-based message authentication code (HMAC) functions, SHA 2, SHA 3, etc. The generated hash can then be sent over a secured communication channel from the blockchain client to the one or more user devices of each party for signing. The secured communication channel can be a VPN channel, an SSH channel, a TLS channel, or any similar secured communication channel. Upon receiving the generated hash of the message, each party can then sign the hash using one of a set of private keys of the computer system. In some implementations, signing the hash of the message can include encrypting the hash with a public key. After signing the hash, each party can send the signed hash to the management component via the secured communication channel. In some embodiments, each party can send the signed hash as a transaction over the network.

In some embodiments, the management component can build a transaction reflecting the one or more cryptographic signatures and broadcast the transaction over the network. Multiple blockchain clients can listen to the network for transactions being broadcasted. The one or more blockchain clients can retrieve the transaction. In response to retrieving the transaction, a blockchain client of the one or more blockchain clients can validate the transaction data. Validating the transaction data can involve the blockchain client applying a set of validation rules to the transaction. In some embodiments, the set of validation rules can include verifying that the IP address associated with the transaction data is within a range. In some embodiments, the set of validation rules can include verifying that the computer system ID associated with the transaction data matches a list of predefined IDs. For example, the blockchain client can compare the computer system ID with a list of predefined IDs stored, e.g., locally on the blockchain client. In some embodiments, the set of validation rules can include verifying that the computer system configuration associated with the transaction data matches a predefined configuration. For example, the blockchain client can compare the computer system configuration with a predefined configuration stored, e.g., locally on the blockchain client. In some embodiments, the set of validation rules can include verifying that a version number of a particular software module associated with the transaction data matches a stored version number. For example, the blockchain can compare the version number of the particular software module associated with the transaction data with a version number stored, e.g., locally on the blockchain client. The set of validation rules can be set by a majority of nodes of the distributed ledger network.

At block 414, in response to validating the transaction data, the blockchain client can store the transaction data on a block of the distributed ledger network. Storing the transaction data on a block can include adding the transaction data to a current block (e.g., the block that is being assembled based on incoming transaction data). In some embodiments, the blockchain client can set the block to a predefined size. The predefined size can be defined by the distributed ledger network and/or the computer system and/or a user. In some embodiments, the blockchain client can determine that the block has reached the predefined size. In response to determining that the block has reached the predefined size, the blockchain client can broadcast the block on the network to other nodes (i.e., the other blockchain clients) of the distributed ledger network. In some embodiments, the blockchain client can add the block to a local copy of the blockchain stored in a local storage of the blockchain client.

In some embodiments, the management component can confirm that the corresponding prerequisite has been satisfied. Confirming that the corresponding prerequisite has been satisfied can include listening for a block storing transaction data relating to the one or more cryptographic signatures broadcasted over the network. The management component can then compare the one or more cryptographic signatures recorded on the block to the corresponding prerequisite retrieved from the database. Responsive to confirming that the corresponding prerequisite has been satisfied, the management component can send a notification comprising the one or more remedial actions described at block 406 to the computer system. The computer system can execute the one or more remedial actions.

Figure 5:
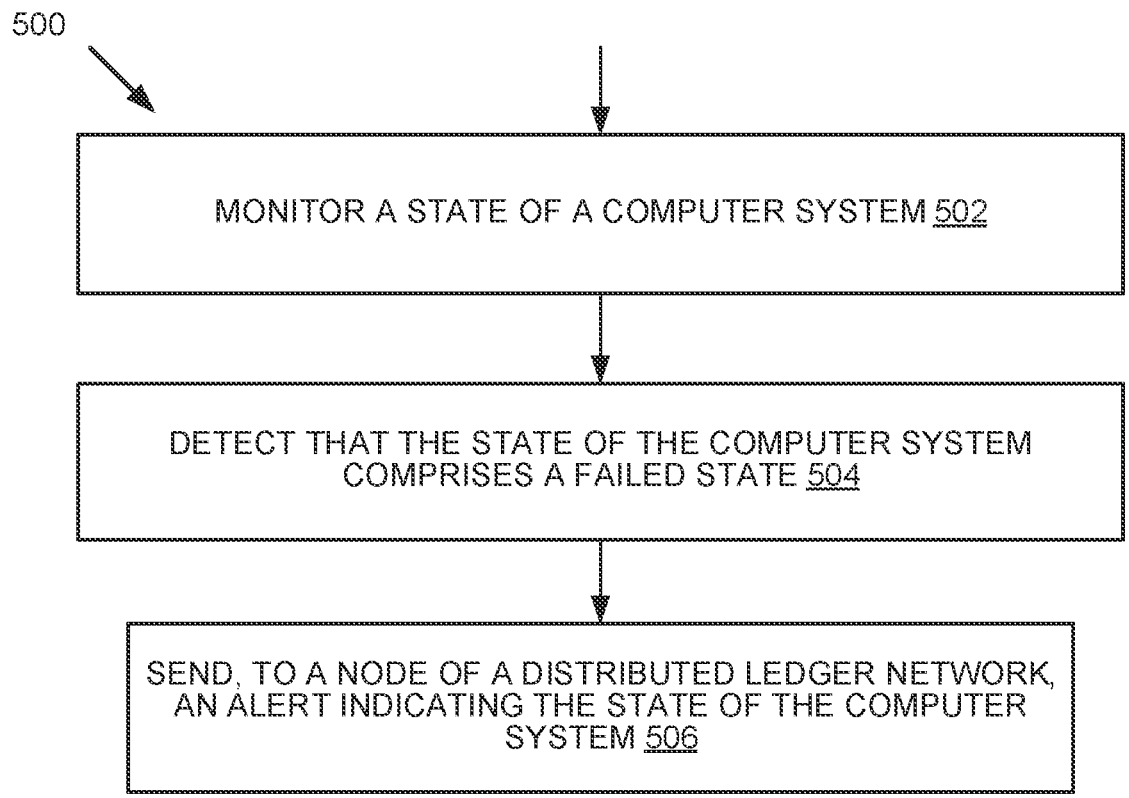
FIG. 5 depicts a flow diagram illustrating an example method of managing standard operating procedures using distributed ledger networks in accordance with some implementations of the present disclosure.

FIG. 5 is a flow diagram illustrating an example method 500 for managing standard operating procedures using distributed ledger networks in accordance with one or more aspects of the present disclosure. Method 500 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 5, in one embodiment, method 500 begins at block 502, where a monitoring component (e.g., the management component 150 of FIG. 1) of a computer system (e.g., the computer system 140 of FIG. 1) monitors a state of the computer system. The computer system can be a production system (e.g., a managed services system). The state of the computer system can be, for example, that the computer system is experiencing a system failure. In some embodiments, the monitoring component can include a user interface (e.g., the administrator UI 150-1 of FIG. 1). A user (e.g., an administrator for the computer system) can interact with the user interface in order to perform a particular change to the computer system.

At block 504, the monitoring component detects that the state of the computer system is a failed state. In some embodiments, detecting that the state of the computer system is a failed state includes detecting that the computer system is experiencing a system failure.

At block 506, the monitoring component sends, in response to detecting that the state of the computer system is a failed state, an alert indicating the state of the computer system. Sending the alert can include building a transaction with data relating to the alert and broadcasting the transaction over the network. The transaction data broadcasted can be, for example, an IP address of the computer system, a computer system ID, a computer system configuration (i.e., a set of software modules with their respective version numbers, etc. In some embodiments, the alert can indicate a failure of the computer system. In response to broadcasting the alert, the monitoring component can listen to the broadcast over the network for transactions broadcasted from a blockchain client of the distributed ledger network. If a transaction including data relating to the alert is broadcasted from a blockchain client of the distributed ledger network (i.e., that the transaction has been validated and stored in a block on the distributed ledger network), the monitoring component can look up the alert in a database (e.g., the SOP database 130 of FIG. 1) for a corresponding prerequisite. The database can include information relating to SOPs, including a list of SOPs, the corresponding triggers for each SOP, and the corresponding prerequisite for each SOP. In some embodiments, the corresponding prerequisite can be one or more required signatures from one or more parties (e.g., stakeholders including site reliability engineering teams, security teams, infrastructure teams, application teams, vendors, customers, etc.). Responsive to retrieving the corresponding prerequisite from the database, the monitoring component can generate one or more cryptographic signatures using a cryptographic hash function.

In some embodiments, the monitoring component can create and transmit a message to each user requesting their signature via a corresponding user device (e.g., the user devices 110, 115 of FIG. 1). Each message can include one or more remedial actions retrieved from the database. The monitoring component can generate a hash of each message so that it may be sent to each party to be cryptographically signed. The hash for the message can be generated using a secure cryptographic hash function, such as hash-based message authentication code (HMAC) functions, SHA 2, SHA 3, etc. The generated hash can then be sent over a secured communication channel from the monitoring component to the one or more user devices of each party for signing. The secured communication channel can be a VPN channel, an SSH channel, a TLS channel, or any similar secured communication channel. Upon receiving the generated hash of the message, each party can select the one or more remedial actions to be executed on the computer system. Each party can then cryptographically sign a response message that contains identifiers of each of the one or more remedial actions using the hash using one of a set of private keys of the computer system. In some implementations, signing the hash of the message can include encrypting the hash with a public key. After signing the hash, each party can send the signed hash to the management component via the secured communication channel. In some embodiments, after signing the hash, each signed hash can be transmitted as a transaction and broadcasted over the network.

In some embodiments, in response to receiving the signed hash from each party, the monitoring component can select the one or more remedial actions to be executed on the computer system based on the identifiers of the one or more remedial actions selected by each party and sent using the signed hash. In some embodiments, the monitoring component can select the one or more remedial actions using a majority rule or a consensus rule of the one or more parties that sent signed hashes.

In some embodiments, the monitoring component can build additional transaction data and broadcast the additional transaction data over the network. The additional transaction data can include the one or more cryptographic signatures. A blockchain client can listen to the network for transactions being broadcasted and can retrieve and validate the transaction data before storing the transaction on a block of the distributed ledger network, as described in more details with regard to FIGS. 3 and 4.

In some embodiments, in response to broadcasting the additional transaction data including the one or more cryptographic signatures, the monitoring component can determine that the additional transaction data was stored on a block of the distributed ledger network. Determining that the additional transaction data was stored on a block of the distributed ledger network can include listening to the network for a transaction including the one or more cryptographic signatures being broadcasted over the network by a blockchain client of the distributed ledger network. In response to the transaction including the one or more cryptographic signatures being broadcasted over the network, the monitoring component can retrieve data from the database (e.g., the SOP database 130 of FIG. 1) relating to the corresponding one or more remedial actions selected by the monitoring component to be executed on the computer system for the alert. In some embodiments, the one or more remedial actions can be a set of predefined actions to be executed on the computer system. The one or more remedial actions are to be performed in response to the alert received by the monitoring system at block 502. The monitoring component can execute or cause to be executed (e.g., send a notification comprising the one or more remedial actions to be executed to the computer system) the one or more remedial actions on the computer system. In response to the one or more remedial actions being executed on the computer system, the monitoring component can build and broadcast a transaction with data including the one or more executed remedial actions over the network and the result of executing the one or more remedial actions. The monitoring component can further monitor (i.e., identify) a current state of the computer system in response to the one or more remedial actions executed. In response to identifying the current state of the computer system, the monitoring component can build and broadcast a transaction including the current state of the computer system in response to the one or more remedial actions executed on the computer system.

Figure 6:
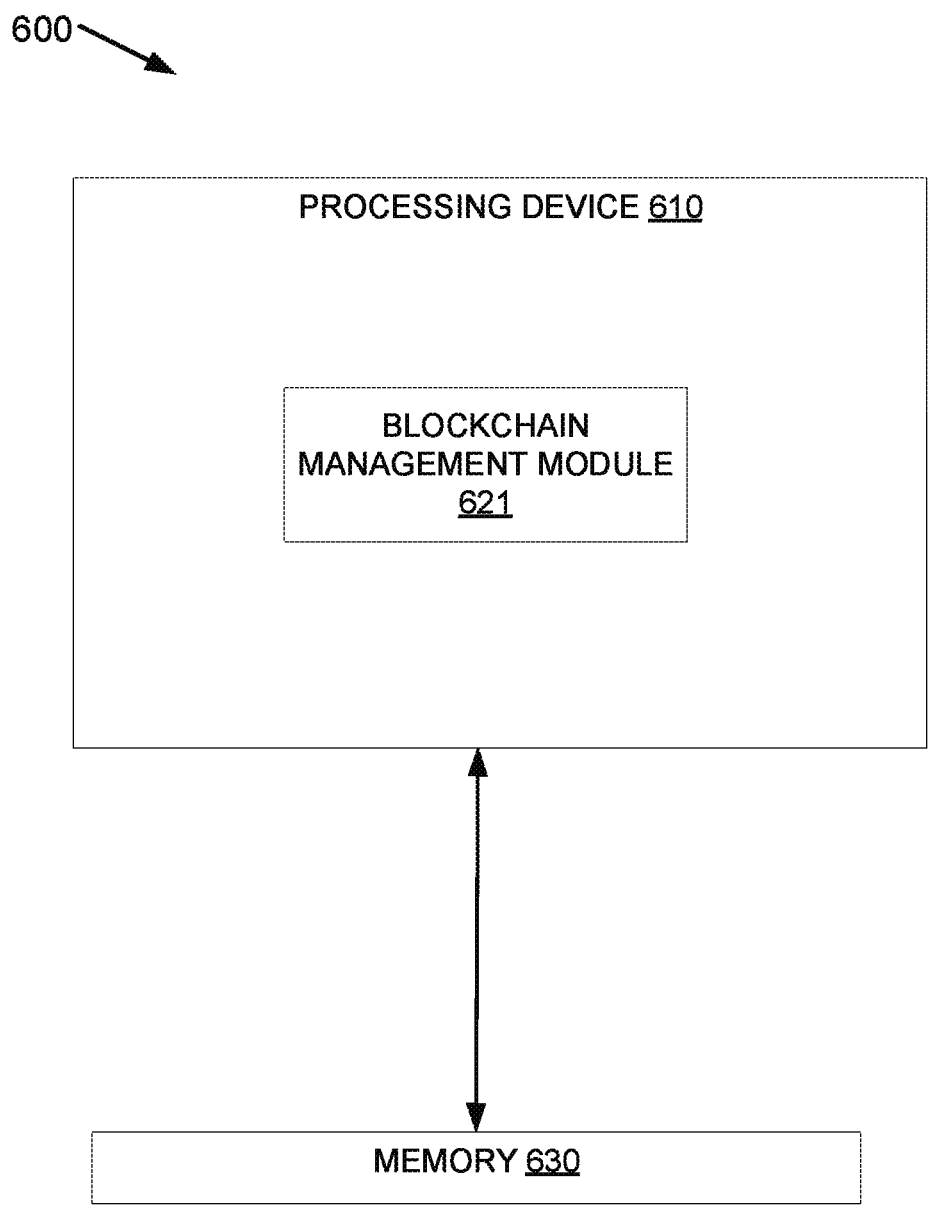
FIG. 6 depicts a block diagram example of a computer system operating in accordance with one or more aspects of the present disclosure.

FIG. 6 is a block diagram example of a computer system 600 operating in accordance with one or more aspects of the present disclosure. Computer system 600 may be the same or similar to the distributed ledger network 120 of FIG. 1 and may include one or more processing devices and one or more memory devices. In the example shown, computer system 600 may include blockchain management module 621. Alternatively, the functionality of blockchain management module 621 may be divided into multiple sub-modules.

Blockchain management module 621 is responsible for receiving monitoring the state of the computer system (e.g., the computer system 140 of FIG. 1). The blockchain management module 621 is further responsible for building and sending (i.e., broadcasting) transactions over a network (e.g., the network 101 of FIG. 1). The transactions can include an alert indicating the state of the computer system. The transactions can further include data with one or more cryptographic signatures from one or more users. The transactions can further include data storing one or more remedial actions performed on the computer system and the results of performing the one or more remedial actions. The transactions can further include data storing a current state of the computer system in response to the one or more remedial actions executed on the computer system. The blockchain management module 621 is also responsible for monitoring any user requests for a change in configuration of the computer system. The user requests can be from a user device (e.g., the user devices 110, 115 of FIG. 1). The blockchain management module 621 is further responsible for listening to the network for broadcasts, such as broadcasts of transactions from a blockchain client (e.g., the blockchain clients 160, 165) of a distributed ledger network (e.g., the distributed ledger network 120). In response to receiving transactions from a blockchain client, the blockchain management module 621 is also responsible for retrieving corresponding data related to the alert from a database (e.g., the SOP database 130 of FIG. 1). The blockchain management module 621 is also responsible for retrieving data from the database regarding corresponding prerequisites for the alert, such as required signatures from one or more parties prior to executing remedial actions. The blockchain management module 621 is further responsible for transmitting and receiving messages from the one or more parties with cryptographic signatures. Further details with regard to the blockchain management module is described herein above with reference to FIGS. 3-5.

Figure 7:
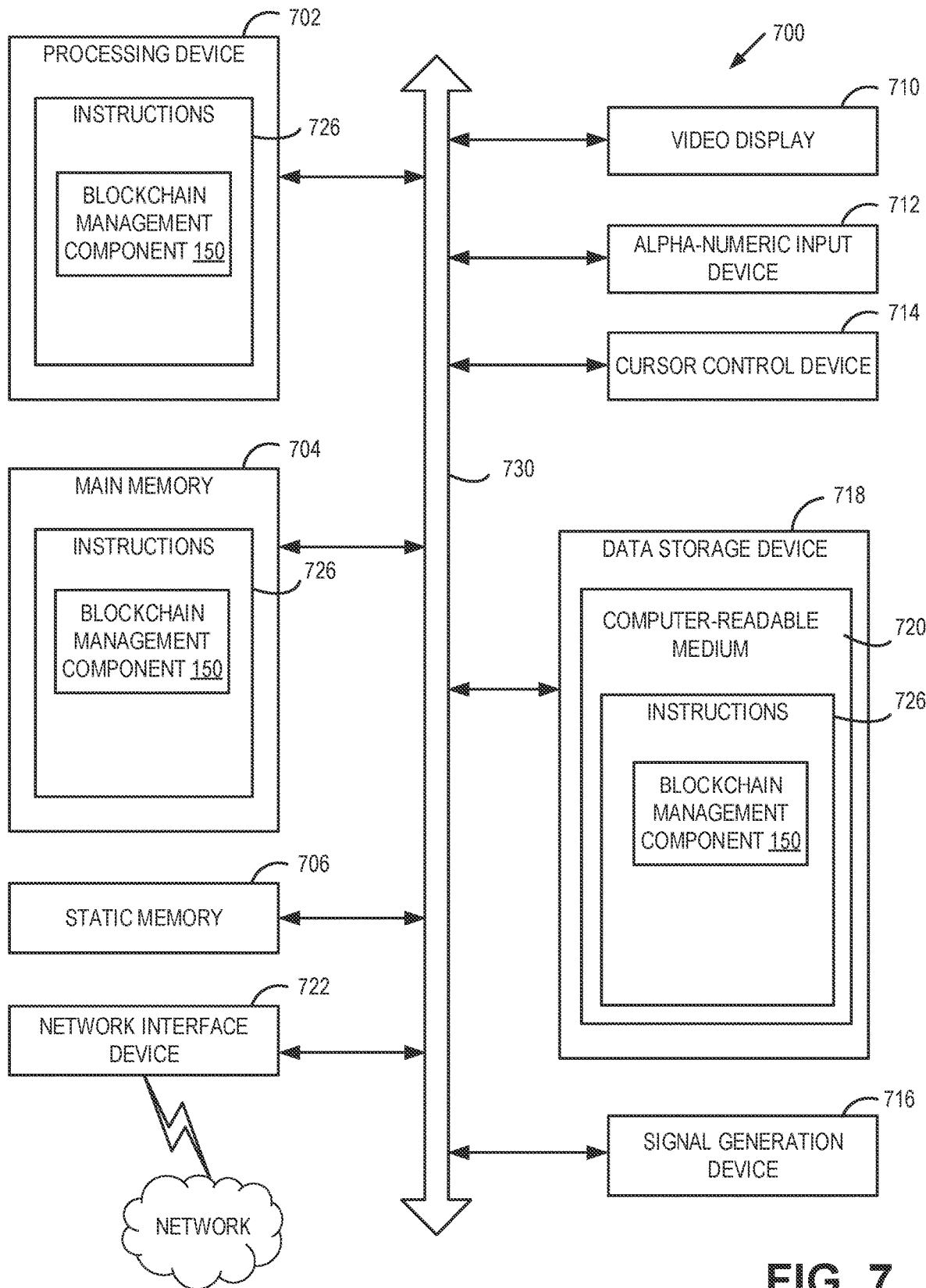
FIG. 7 depicts a block diagram that illustrates one implementation of a computer system in accordance with one or more aspects of the present disclosure.

FIG. 7 is a diagrammatic representation of a machine in the exemplary form of a computer system 700 within which a set of instructions for causing the machine to perform any one or more of the methodologies discussed herein may be executed. In various illustrative examples, computer system 700 may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 700 may include a processing device 702, a main memory 704 (e.g., read-only memory (ROM), flash memory, dynamic random access memory (DRAM) (such as synchronous DRAM (SDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 702 may also be one or more special-purpose processing devices such as an application specific integrated circuit (ASIC), a field programmable gate array (FPGA), a digital signal processor (DSP), network processor, or the like. Processing device 702 may be configured to execute SOP execution management system 120 for programming the operations and steps discussed herein.

Computer system 700 may further include a network interface device 708. Computer system 700 may also include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Data storage device 718 may include a machine-readable storage medium (or more specifically a computer-readable storage medium) 720 having one or more sets of instructions (e.g., instructions executed by the SOP execution management system 120) for the computer system 700 embodying any one or more of the methodologies of functions described herein. The instructions 726 for the computer system 700 may also reside, completely or at least partially, within main memory 704 and/or within processing device 702 during execution thereof by computer system 700; main memory 704 and processing device 702 also constituting machine-readable storage media. The instructions 726 may further be transmitted or received over a network 726 via network interface device 708.

Machine-readable storage medium 720 may also be used to store the device queue manner logic persistently. While machine readable storage medium 720 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200 and/or method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a node of a distributed ledger network, first transaction data, wherein the first transaction data comprises an alert derived from a state of a computer system;
   storing, by the node, the first transaction data in a first block of the distributed ledger network;
   receiving, by the node, second transaction data, wherein the second transaction data comprises an identifier of a remedial action performed on the computer system in response to the alert and a result of performing the remedial action;
   storing the second transaction data in a block of the distributed ledger network, wherein the block is provided by one of: the first block or a second block;
   receiving, by the node, third transaction data, wherein the third transaction data comprises one or more cryptographic signatures from one or more stakeholders of the computer system; and storing, by a processing device of the node, the third transaction data in the first block, wherein at least one of the first transaction data, the second transaction data, or the third transaction data are accessed by a device as part of a recovery process for the computer system.

2. The method of claim 1, further comprising:
receiving, by the node, fourth transaction data, wherein the fourth transaction data comprises a state of a production system in response to performing the remedial action.

3. The method of claim 1, further comprising:
receiving, by the node, fourth transaction data, wherein the fourth transaction data comprises one or more cryptographic signatures from one or more parties; and
storing the fourth transaction data in a fourth block of the distributed ledger network.

4. The method of claim 3, wherein each cryptographic signature in the one or more cryptographic signatures comprises a cryptographic hash value of a message transmitted to the one or more parties.

5. The method of claim 1, wherein the first transaction data is received in response to a system failure of the computer system, and wherein the alert is indicative of the system failure.

6. The method of claim 1, wherein the first transaction data is received in response to a user request for a configuration change of the computer system, and wherein the alert is to indicate the user request.

7. A system comprising:
a distributed ledger network client; and
a distributed ledger network comprising a node to:
 receive, from the distributed ledger network client, first transaction data, wherein the first transaction data comprises an alert derived from a state of a computer system;
 store the first transaction data in a first block of the distributed ledger network;
 receive second transaction data, wherein the second transaction data comprises an identifier of a remedial action performed on the computer system in response to the alert and a result of performing the remedial action;
 store the second transaction data in a block of the distributed ledger network, wherein the block is provided by one of: the first block or a second block;
 receive, by the node, third transaction data, wherein the third transaction data comprises one or more cryptographic signatures from one or more stakeholders of the computer system; and
 store, by a processing device, the third transaction data in the first block, wherein at least one of the first transaction data, the second transaction data, or the third transaction data are accessed by a device as part of a recovery process for the computer system.

8. The system of claim 7, wherein the node is further to:
receive fourth transaction data, wherein the fourth transaction data comprises a state of a production system in response to performing the remedial action.

9. The system of claim 7, wherein the node is further to:
receive fourth transaction data, wherein the fourth transaction data comprises one or more cryptographic signatures from one or more parties; and
store the fourth transaction data in a fourth block of the distributed ledger network.

10. The system of claim 9, wherein each cryptographic signature in the one or more cryptographic signatures comprises a cryptographic hash value of a message transmitted to the one or more parties.

11. The system of claim 7, wherein to receive the first transaction data, the node is to receive the first transaction data in response to a system failure of the computer system, and wherein the alert is indicative of the system failure.

12. The system of claim 7, wherein to receive the first transaction data, the node is to receive the first transaction data in response to a user request for a configuration change of the computer system, and wherein the alert is to indicate the user request.

13. A non-transitory computer-readable storage medium comprising instructions that, when executed by a processing device, cause the processing device to:
monitor, by a monitoring component of a computer system, a state of the computer system;
detect that the state of the computer system comprises a failed state;
send, to a node of a distributed ledger network, an alert indicating the state of the computer system;
determine that transaction data stored on a block of the distributed ledger network comprises one or more cryptographic signatures, wherein the one or more cryptographic signatures satisfy a prerequisite condition;
in response to the determination that the transaction data stored on the block of the distributed ledger network comprises the one or more cryptographic signatures, monitor one or more remedial actions executed on the computer system; and
send, by the processing device and to the node of the distributed ledger network, data comprising the one or more remedial actions executed on the computer system.

14. The non-transitory computer-readable storage medium of claim 13, wherein the instructions, when executed by the processing device, cause the processing device further to:
generate a user interface, wherein the user interface is modified to perform a change to the computer system.

15. The non-transitory computer-readable storage medium of claim 13, wherein the instructions, when executed by the processing device, cause the processing device further to:
send, to the node of the distributed ledger network, data comprising a result of the one or more remedial actions executed on the computer system.

16. The non-transitory computer-readable storage medium of claim 13, wherein the instructions, when executed by the processing device, cause the processing device further to:
in response to the monitoring of the one or more remedial actions executed on the computer system, detect a current state of the computer system; and
send, to the node of the distributed ledger network, data comprising the current state of the computer system.

17. The non-transitory computer-readable storage medium of claim 13, wherein each cryptographic signature in the one or more cryptographic signatures comprises a cryptographic hash value of a message transmitted to one or more parties.

* * * * *